Jan. 7, 1969  L. W. FRANCIS ET AL  3,420,557
BUILDER'S SCAFFOLDING
Filed April 25, 1967

Inventors
Leslie Walter Francis
Peter Eric Gostling
By Lucke & Lucke

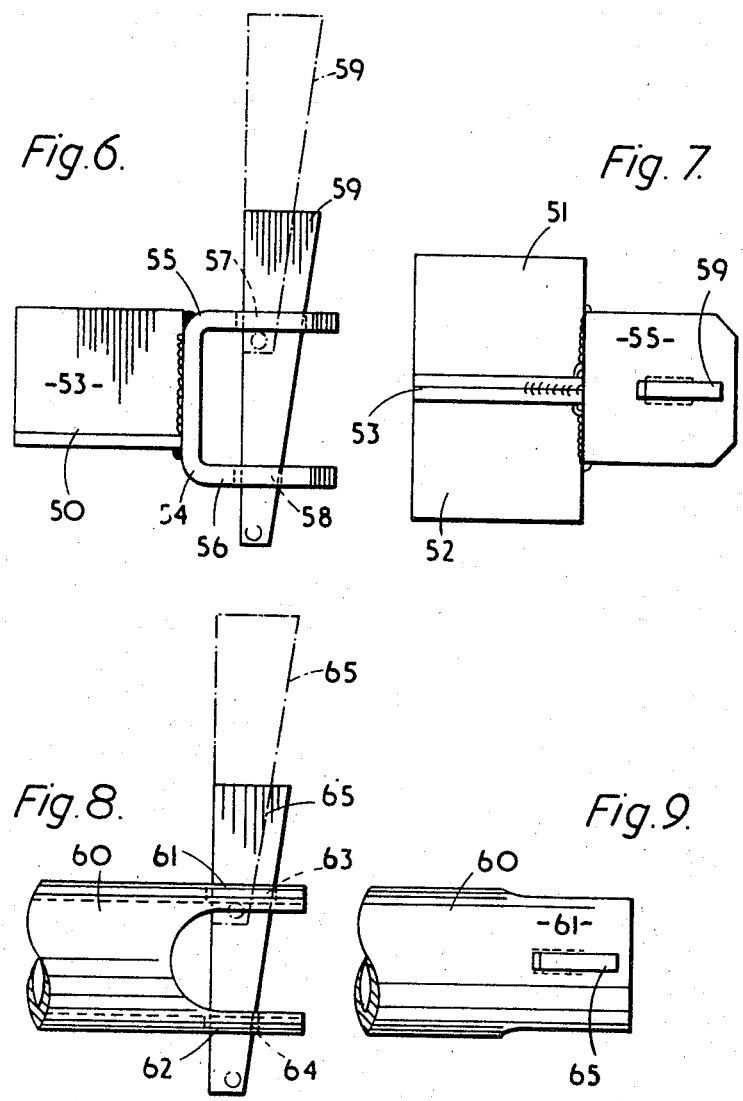

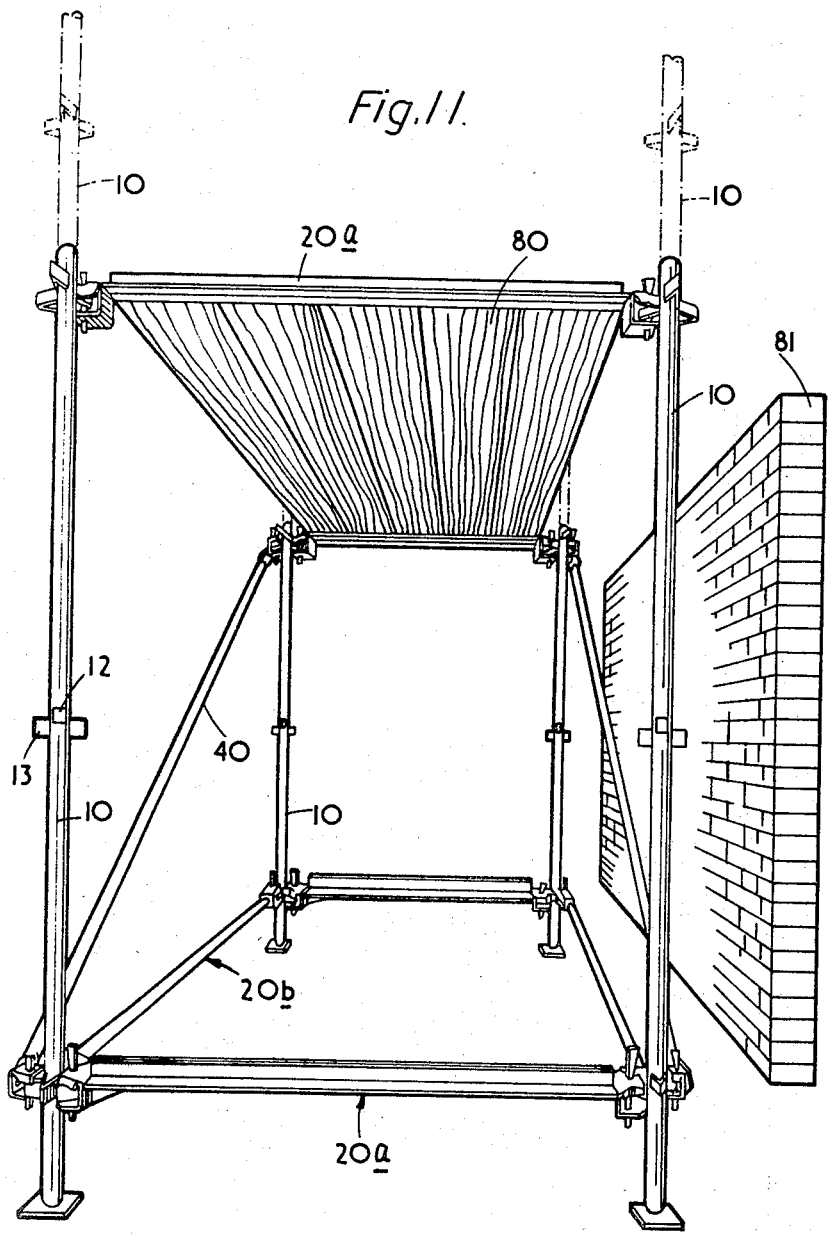

3,420,557
BUILDER'S SCAFFOLDING
Leslie Walter Francis, Birmingham, and Peter Eric Gostling, Coldfield, England, assignors to Kwikform Limited, Birmingham, England, a British company
Filed Apr. 25, 1967, Ser. No. 633,594
Claims priority, application Great Britain, Apr. 29, 1966, 18,830/66
U.S. Cl. 287—54
Int. Cl. E04g 7/00; F16b 7/00
2 Claims

ABSTRACT OF THE DISCLOSURE

This invention relates to means for connecting together cross members and upright members of builder's scaffolding. An upright member is provided with at least one socket and the end of a cross member is provided with connector means comprising two spaced apart limbs each having an opening mounting a wedge clamping member. In the operative connecting position the two limbs extend respectively above and below the socket with the wedge clamping member in pressure engagement with both the openings and an internal clamping face of the socket extending parallel to the upright member, also the outer free ends of the limbs which constitute abutment faces are in pressure engagement with the side of the upright member. The upper limb of the connector means may be provided with dependent lips to locate the connector means in relation to the socket and to prevent angular movement of the associated cross member. The connector means can be pivoted to the end of a cross member.

---

This invention relates to builder's scaffolding of the kind which comprises a plurality of upright member connected together by cross members with each upright member being provided with at least one socket formed with an internal clamping face directed towards and extending substantially parallel to the adjacent side of the upright member and, each cross member mounting a wedge clamping member for clamping engagement with the internal clamping face of a socket so as to rigidly connect an upright member and cross member together. Such builder's scaffolding is herein referred to as builder's scaffolding of the kind specified.

The term "cross members" as used herein includes ledger elements which extend horizontally substantially parallel to the length of wall or other structure adjacent the scaffolding, transom elements which also extend horizontally but transverse to such ledger elements and, any other elements of the scaffolding which extend transversely to the upright members either perpendicularly or at an inclination thereto and which are adapted to be connected to or, to connect together upright members of the scaffolding, for example, diagonal bracing elements, shelf brackets, toe rails and platform guard rails.

A previouinly known embodiment of builder's scaffolding of the kind afore-specified embodies a particular form of connecting means for connecting together upright members and cross members, such connecting means comprising sets of sockets provided at spaced apart positions on the upright members with each socket being adapted to receive a dependent spigot provided at one end of a cross member and, each spigot mounting a wedge clamping member for clamping engagement with both the spigot and socket.

With this prior form of connecting means for builder's scaffolding of the kind specified, each spigot is formed with a curved abutment face adapted to abut against the adjacent curved surface of the upright member when the spigot is received in a socket with the wedge clamping member in clamping engagement with both the spigot and socket.

Such an arrangement of connecting means is perfectly satisfactory in rigidly securing the upright member and cross member together but, it will be appreciated that, in order to connect or disconnect a cross member to or from an upright member it is necessary to lift the cross member in relation to the upright by a distance corresponding at least to the length of the spigot so as to insert the spigot in, or remove the spigot from, the socket. Accordingly, as there are usually two such arrangements of connecting means for connecting together a pair of upright members by a cross member, the whole of the weight of the cross member has to be lifted vertically for the simultaneous engagement or disengagement of the two spigots.

Furthermore, the disengagement of the connecting means may be quite difficult if the scaffolding has been subjected to adverse weather conditions for a period. For instance, with this prior form of connecting means there is face to face contact over a substantial area of the curved abutment faces of both the spigot and the upright member and, if corrosion occurs between these two faces then, although the wedge clamping member may be removed or released from clamping engagement readily by striking its free lower portion extending through the socket adjacent the spigot, it is difficult to release the spigot from its engagement with the upright member as the spigot must be moved vertically out of the socket. This difficulty is accentuated by the fact that, if it is necessary to release the spigot by impacting blows, there is only a very small striking area on the free end of the spigot which extends below the socket and this is adjacent to the upright member. A further difficulty with this prior arrangement is that when the spigot is struck by impacting blows, the whole weight of the cross member has to be lifted by the impact blows so removal can be very arduous.

An object of the present invention is to provide in a builder's scaffolding of the kind specified connecting means for connecting together upright members and cross members which facilitates both the connection and disconnection of cross members and upright members especially having regard to overcoming the disadvantages already referred to in respect of the prior known form of scaffolding of the kind specified.

According to the present invention, we provide in builder's scafflolding of the kind specified, means for connecting together an upright member and a cross member, said connecting means comprising connector means mounted on one end of the cross member and including two limbs which in the operative position are spaced apart vertically to permit of a socket provided on the upright member being received therebetween, and, the free end of each limb having an abutment face adapted to abut against the side of the upright member, each limb further being provided with an opening which receives the wedge clamping member, the arrangement of said connecting means being such that in rigidly connecting an upright member the two limbs of the connector means are disposed vertically spaced on either side of the socket with the wedge clamping member in pressure engagement with both the slots of each limb and the internal clamping face of the socket, whereby said abutment faces of the two limbs are also in pressure engagement with the side of the upright member.

Although the connecting means of the present invention as aforedescribed includes a socket provided on an upright member and a wedge clamping member, it does not embody a spigot on the end of a cross member which is adapted to be received in the socket.

Accordingly, the connection of cross members to upright members is easier in that, as there is no spigot on the end of a cross member, the cross member does not have to be lifted by at least the height of the length of the spigot above the socket before the spigot can be inserted in the socket. Furthermore, the connecting means is much simpler to manufacture than the known means previously described, also it is much lighter in weight so that the weight of cross member is reduced and the overall weight of a scaffolding structure is less. These two facts contribute considerably to reducing the total cost of producing scaffolding and erecting such scaffolding.

A further advantage of the present invention is that when the scaffolding is being erected the weight of the cross member is supported by the upper limb of the connector means which rests on the upper face of the socket, itself secured to the upright member, thus during the time it takes to secure a cross member to two upright members as the case may be, the weight of the cross member does not have to be supported by workmen and this feature is of great practical advantage.

A further advantage of the broadest form of the present invention as previously described is that the removal of cross members is generally facilitated because once the wedge has been released from its clamping engagement, the cross member can be removed by a sideways movement, not a vertical movement as was necessary with the known means. This removal by a sideways movement is very advantageous where the cross member is used to support timber boards. With the connecting means of the present invention, the difficulties associated with corrosion are also overcome as the wedge may easily be removed and the cross member removed freely in a sideways direction. There being no substantial area of pressure engagement between the upright member and abutment faces which on corrosion thereat could interfere with such sideways removal.

According to a further feature of the present invention we provide that the two limbs of the connector means comprise two parallel arms extending outwardly from the end of the cross member with the limb which is adapted to be uppermost in relation to the socket being provided with two dependent lips adapted to extend on either side of the socket and each extending transversely to the abutment face of the limb with the distance between the lower edge of each lip and the lower limb being greater than the vertical depth of the socket.

The dependent lips serve to locate the connector means and the associated cross member with respect to the upright member both in transverse and angular directions. Preferably, the lips are so positioned and the width of the upper limb so chosen with respect to the maximum width of the socket to only permit of 5° angular movement of the cross member about the longitudinal axis of the upright member in a horizontal plane perpendicular to the upright member when the abutment faces of the two limbs of the connector means engage with the upright member.

It is advantageous to provide for such 5° angular movement of the cross member so as to permit of the connecting means at each end of the cross member connecting a pair of upright members together to be disconnected one at a time. The angular movement of 5° is preferred in the case of the standard lengths of transom and ledger elements which range from 5 feet (1.52 metres) to 10 feet (3.04 metres), but such amount of angular movement may be varied if desired in accordance with the condition to be obtained in the scaffolding structure as a whole by varying the relative dimensions in respect of the internal width between the lips in relation to the width of the socket.

The provision of these dependent lips on the upper limb enables the connector means to be correctly located with respect to the socket during the prepositioning of the cross member so that when the wedge clamping member is driven into clamping engagement it is correctly positioned in relation to the socket. Advantageously, by providing the dependent lips on the upper limb of the connector means, the location and rigid connection of the cross member to an upright member is effected whilst the upper limp rests on the upper edge of the socket and is located thereon to prevent it slipping off sideways thus, as has been aforementioned, during the time taken for such location and connection the entire weight of the cross member does not have to be supported by workmen.

The preferred form of connecting means provided with the dependent lips as aforedescribed may easily be disconnected in a manner similar to that described in relation to the broadest form of the present invention, however, with this preferred form it is necessary to lift the associated end of the cross member by a height corresponding to the depth of the lips if the cross member is to be moved sideways. On the other hand if the cross member is not to be removed sideways but removed in a direction substantially in alignment with the longitudinal axis of the cross member, the cross member does not have to be lifted as the 5° angular movement of the cross member gives sufficient clearance to the free end, i.e. disconnected end of the cross member, to permit of the cross member being removed in this direction without interference from the upright member to which the free end was previously connected.

Preferred embodiments of the invention are illustrated in the accompanying drawings wherein:

FIGURE 6 is a side elevation of an alternative form of connector means according to the present invention not embodying the dependent lips;

FIGURE 7 is a plan view of the means depicted in FIGURE 6;

FIGURE 8 is a side elevation of a further form of connector means according to the present invention integral with the cross member and not embodying the dependent lips;

FIGURE 9 is a plan view of the means depicted in FIGURE 8;

FIGURE 11 is a perspective view of a scaffolding structure embodying the present invention.

Figure 1:
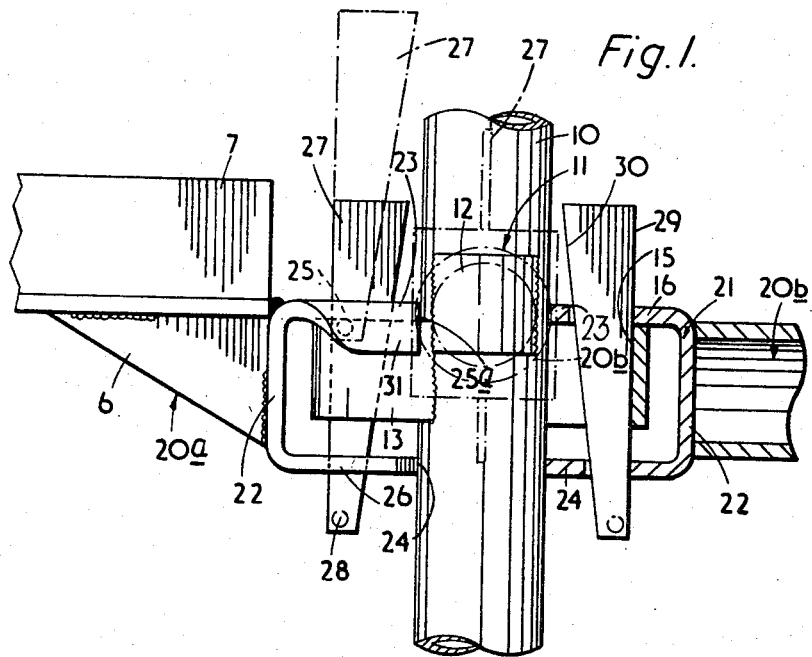
FIGURE 1 is a side elevation partly in section of one form of means for connecting an upright member to cross members which embodies the dependent lips, the cross members shown on the left and right hand sides of FIGURE 1 being of two different kinds and the right hand cross member being the same as the cross member shown in a central position in chain dotted lines.
Figure 2:
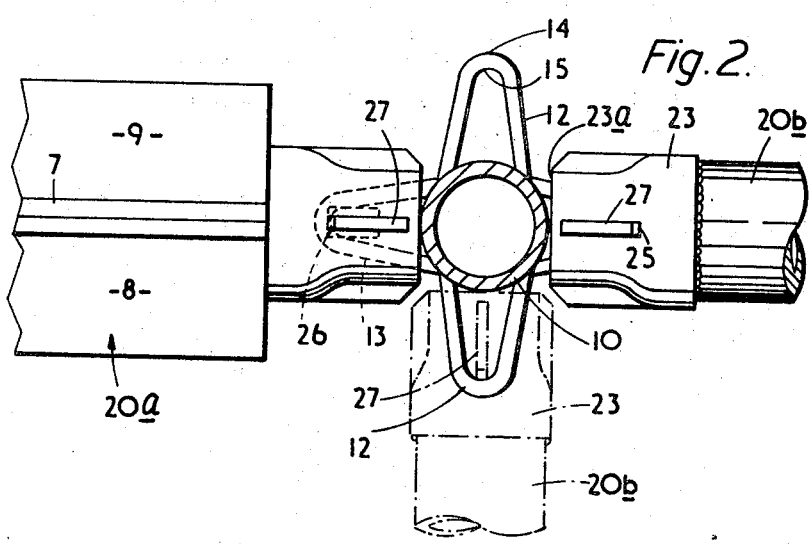
FIGURE 2 is a plan view of the arrangement of FIGURE 1.

Referring to the accompanying drawings of FIGURES 1 and 2, the upright member 10 in the form of an ordinary scaffold tube has secured thereto sets of sockets 11 comprising a pair of ledger and transom element supporting sockets 12, 13, respectively. The two ledger supporting sockets 12 are at a slightly higher level than the transom supporting sockets 13.

Each socket is formed by bending a flat metal strip to form a wide V the ends of which are welded to the exterior of an upright member so that each set 11 of sockets is of generally four armed configuration when viewed in plan, as can be seen from FIGURE 2, with individual sockets being spaced symmetrically around the periphery of the upright member.

The connecting portion 14 or the apex of the V of each socket is slightly flattened and the internal face thereof provides an internal clamping face 15 extending parallel to the adjacent side of the upright member 10. The upper face 16 of the socket extends substantially perpendicular to the adjacent side of the upright member and provides a horizontally extending abutment surface when the upright member is in situ.

Each upright member of the scaffolding would be provided with several such sets 11 of sockets equidistantly spaced along the length of the upright member.

In the embodiments depicted in the drawings of FIGURES 1 and 2 each cross member 20a or 20b is of known kind. The cross member 20a depicted on the left hand side of the drawings is a transom element comprising a pair of angle members 8, 9 whose upstanding flanges are welded so as to provide a central upstanding flange 7. The horizontal surfaces of the angle members 8, 9 are adapted to support the ends of scaffold boards or the like to provide a platform for workmen.

The cross member 20b depicted on the right hand side of FIGURES 1 and 2 comprises a tubular element of substantially the same diametric dimensions as the upright member. The length of the tube may be varied in accordance with the requirements, and, commonly such members are used as ledger elements.

Each cross member 20a or 20b is provided with connector means 21 comprising a member substantially of channel section of which the base 22 is welded to the end of the cross member 20a, 20b. In the case of the transom element 20a the base 22 is welded to the end of the cross member through a triangular supporting plate 6 welded to the underside of the oppositely directed angle members 8, 9.

The parallel arms of the channel section member provide an upper limb 23 and a lower limb 24 which are spaced apart a sufficient distance to enable the socket 12 or 13 to be received therebetween. The outer ends of limbs 23, 24, provide abutment faces 23a and 24a respectively, each face being adapted to bear against the adjacent side of the upright member 10 on either side of the socket.

The upper limb 23 of the connector means is provided with a pair of dependent lips 31 which extend transversely to the abutment face 23a. These dependent lips 31 are formed by bending over the edge portions of the upper limb at positions adjacent the free end thereof. The lower edge of each lip 31 is spaced from the lower limb 24 by a distance greater than the vertical depth of a socket 12 or 13 so as to provide sufficient clearance to permit of the sideways removal of the cross member with respect to a socket. With reference also to the view depicted in FIGURE 3 the internal faces 32 of the dependent lips 31 are spaced apart a sufficient amount to accommodate the maximum width of the socket but the maximum distance between these internal faces 32 is chosen so as to limit angular movement of the cross member 20a or 20b in a horizontal plane about the longitudinal axis of the upright member 10 to not more than 5°.

The upper limb 23 is formed with an elongated slot 25 and the lower limit 24 is formed with another slot 26, the two slots being of dimensions suitable for mounting the wedge clamping member 27 associated with the connector means.

The wedge clamping member 27 is provided with a small protrusion 28 at its narrow end and the slot 27 in the lower limb 24 is of width sufficiently great to enable the wedge to be passed therethrough whilst the width of the slot 25 in the upper limb is slightly less so as to prevent the wedge clamping member 27 being passed through said slot. By this arrangement the wedge member 27 cannot be removed from association with its connector means.

The length and disposition of each of the slots 25 and 26 in their respective limbs 23, 24, is selected in accordance with the angle of inclination of the wedge member 27 and the disposition of the abutment faces 23a, 24a, in relation to the internal clamping face 15 of the socket when the connector means is in situ.

Figure 3:
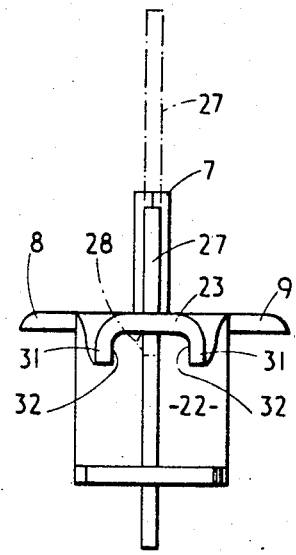
FIGURE 3 is an end view of the cross member and wedge clamping member depicted on the left hand side of FIGURE 1.

In connecting a cross member to an upright member by the connecting means of the embodiment of the present invention as depicted in FIGURES 1, 2 and 3, the cross member may be located relative to the desired socket by bringing the cross member into a position such that the upper limb 23 of the connector means rests on the upper surface 16 of the socket with the wedge clamping member being in the raised position as shown in dotted lines in FIGURES 1 and 3.

The inner faces 32 of the dependent lips 31 engage with the outer faces of the socket so as to position the cross member in the right angular relationship in a horizontal plane, that is perpendicular to the upright member and the socket, this engagement further prevents any undue angular movement such as over 5° of the cross member with respect to the upright member. Accordingly, because of the location of the connecting means and associated cross member in the correct angular relationship with respect to the socket, the wedge clamping member 27 is correctly positioned and can be driven downwardly so that its vertically disposed clamping face 29 is brought into engagement with the internal clamping face 15 of the socket. Due to the wedging action the inclined face 30 of the wedge clamping member is brought into engagement with the outwardly directed face of each of the slots 25, 26 so as to thereby force the abutment faces 23a, 24a of the upper and lower limbs 23, 24 into pressure engagement with the adjacent side of the upright member.

When the wedge clamping member is brought into such pressure engagement with the internal clamping face 15 of the socket and the faces of the slots 25, 26 it can be seen that a rigid connection between the upright member and the cross member is provided.

In disconnecting a cross member from an upright member the wedge is driven upwardly so as to be raised into the position shown in dotted lines in FIGURE 1. If the cross member is to be removed in a sideways direction, the cross member is then lifted by a distance only corresponding to the depth of the dependent lips 31 and the cross member may be removed in a direction corresponding substantially to the longitudinal axis of the cross member in the secured position then such lifting to provide clearance of the lips 31 from the socket upper edge is not essential but, it may be necessary to lift the cross member to clear the captive end of the wedge 27 if it protrudes below the internal face of the upper limb.

Figure 4:
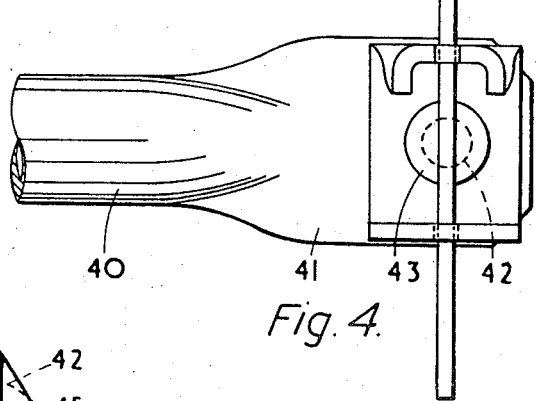
FIGURE 4 is a side elevation, partly in section of the end portion of a bracing member embodying a pivotal form of connector means.
Figure 5:
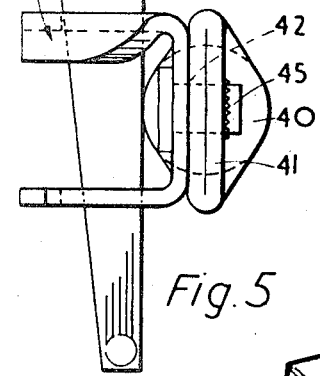
FIGURE 5 is an end view of the bracing member depicted in FIGURE 4.

With reference now to FIGURES 4 and 5 these show an end portion of a bracing member which is in the form of a tubular member 40 having an outer end flattened at 41. In the flattened end 41 there is formed a hole 42 in which is received a pin 43 for pivotally mounting the connector means 44 on the free end of the bracing member 40. The pin 43 at its free end 45 is secured to the bracing member by means of welding.

The connector means 44 is substantially the same as that previously described with reference to FIGURES 1, 2 and 3 but in this case the connector means is pivotally connected to the cross member and may therefore be disposed at various angular relationships thereto.

Referring now to the alternative connector means depicted in FIGURES 6 and 7, this construction is very similar to that of the aforedescribed construction depicted in FIGURES 1, 2 and 3 therefore a detailed description is not deemed necessary.

The cross member 50 comprises a pair of angle members 51, 52 having their adjacent upstanding sides welded together to form a central flange 53. The connector means comprises a channel member 54 whose base is welded to the end of cross member 50 so as to form an aligned extension thereof. The limbs of the channel member provide an upper arm 55 and a lower arm 56 provided respectively with slots 57, 58, with which a wedge clamping member 59 is to engage.

The mode of use of this alternative form of connector means is substantially the same as that aforedescribed in relation to the first embodiment except that the positive and correct location of the cross member and wedge member to the socket is not facilitated by the dependent lips and that no lifting of the cross member relative to the socket is required for either sideways removal or removal in any other direction except that it may be necessary to provide clearance for the captive end of the wedge.

A further form of connector means is depicted in FIGURES 8 and 9 to which reference will now be made. In this further construction the connector means is integral with the cross member 60 which is of conventional tubular form. The end portion of the cross member is cut away so as to provide upper and lower limbs 61, 62 each provided with slots 63, 64 respectively with which the wedge clamping member 65 is adapted to engage. The use of this further construction is substantially the same as previously described.

Figure 10:
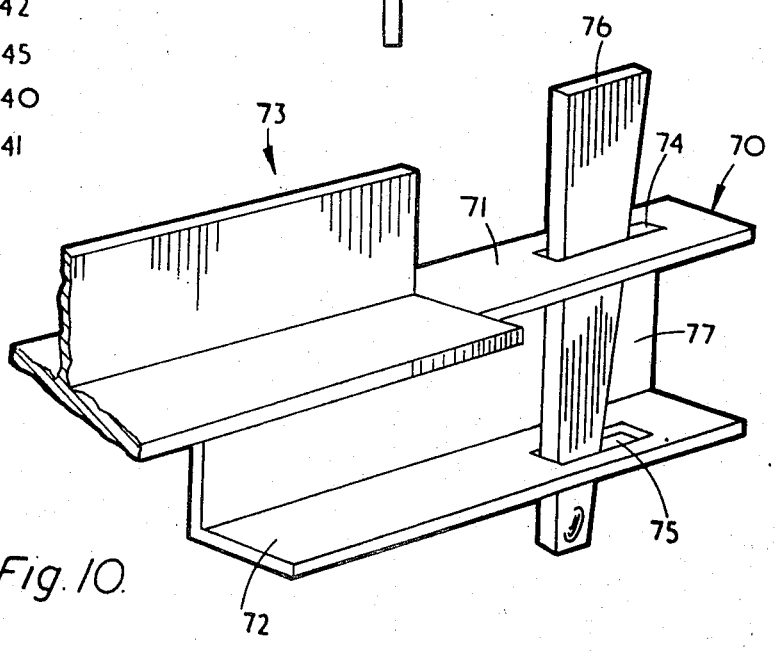
FIGURE 10 is a perspective view of another form of connector means.

Referring now to the embodiment of FIGURE 10, in this the connector means comprises a body 70 in the form of a channel shaped member having side portions 71, 72 providing upper and lower limbs respectively. The body 50 may be connected to the cross member 73 by means of welding the underface of the end of the cross member to the outer surface of the end portion of upper limb. The upper and lower limbs 71, 72 are each provided with a slot 74, 75 through which a wedge clamping member 76 is adapted to extend and to engage with as has previously been described with reference to the other embodiments mentioned herein.

In this embodiment the bottom or connecting portion 77 of the channel shaped body 70, connects the two limbs 71, 72 along the whole of their length along one side and, this has the advantage that the two limbs are more rigidly supported in their spaced apart positions and could not be easily distorted or bend during handling of the scaffolding members.

In all of the foregoing embodiments of the present invention the socket is loaded uniformly by simple tension and shear stresses due to the fact that the internal clamping face 15 of the socket is engaged along the whole of its length by the vertical clamping face 29 of the wedge. Thus, the bending stresses which would tend to distort the socket and also tend to rupture the socket connection, i.e. the weld to the upright member are not present, also, in considering the thrust forces between the wedge clamping member and the socket and the connector means, there are only horizontal components so that there is no resultant vertical thrust between the members which would tend to displace the members relative to one another vertically. The present invention therefore provides a rigid and secure connection between the upright members and cross members which cannot be effected by vibration.

It will also be appreciated that the wedge is used most efficiently in the connector means of the present invention in that the wedge is of minimum length for a given performance. When the wedge is in clamping engagement the entire central portion of the wedge is effecting clamping whilst the upper and lower end portions not effecting clamping are essential to both the knocking in and knocking out of the wedge with respect to the socket.

The view depicted in the drawing of FIGURE 11 illustrates the general form of scaffolding structure erected adjacent a wall 81 with the scaffolding structure comprised of upright members 10, ledger and transom elements 20b, 20a and bracing elements 40 as hereinbefore described and connected together by the connecting means of the present invention. The transom elements 20a support the ends of boards providing a working platform or stage 80 for workmen and their materials.

What we claim then is:

1. In builder's scaffolding, means for connecting together an upright member and a cross member, said means comprising a socket mounted on said upright member and formed with an internal clamping face directed towards and extending parallel to the adjacent side of said upright member, connector means disposed on one end of said cross member, said connector means including two limbs spaced apart to permit said socket being received therebetween with said limbs extending respectively above and below said socket, an abutment face formed on the free end of each said limb and adapted to abut the side of said upright member, two spaced apart dependent lips provided on said uppermost limb with each said lip extending transversely to said abutment face of said uppermost limb and the distance between the lower edge of each said dependent lip and the lower limb being greater than the vertical depth of said socket, said dependent lips providing inwardly directed faces adapted to engage with the outer faces of said socket, an opening provided in each said limb, and a wedge clamping member mounted for clamping engagement with said internal clamping face of said socket and said openings, whereby in connecting said upright member and said cross member together said two limbs extend respectively above and below said sockets and said wedge is in pressure engagement with both said openings and said internal clamping face of said socket with both said abutment faces in pressure engagement with the side of said upright member, said inwardly directed faces of said dependent lips limiting angular movement of said cross member in a horizontal plane about the longitudinal axis of said cross member to not more than 5°.

2. Means for connecting together said upright member and said cross member according to claim 1, wherein said connector means comprises a channel shaped member of which the base is connected to said end of said cross member by means of a pivot extending through said base of said channel member to permit of pivotal movement of the connector means about an axis substantially parallel to the length of the sides of the channel shaped member which constitute said two limbs.

References Cited

UNITED STATES PATENTS

| | | | |
|---|---|---|---|
| 270,051 | 1/1883 | Goebel | 287—54 |
| 1,269,691 | 6/1918 | Dyke | 287—54 |
| 3,179,212 | 4/1965 | Gostling | 287—53.5 |

CARL W. TOMLIN, *Primary Examiner.*

ANDREW KUNDRAT, *Assistant Examiner.*

U.S. Cl. X.R.

182—179; 287—56